US012657271B2

(12) United States Patent
Chang

(10) Patent No.: US 12,657,271 B2
(45) Date of Patent: Jun. 16, 2026

(54) BIOMETRIC GALLERY MANAGEMENT AT CROWDED VENUES

(71) Applicant: Secure Identity, LLC, New York, NY (US)

(72) Inventor: Justin Chang, New York, NY (US)

(73) Assignee: Secure Identity, LLC, New York, NY (US)

( * ) Notice: Subject to any disclaimer, the term of this patent is extended or adjusted under 35 U.S.C. 154(b) by 7 days.

(21) Appl. No.: 18/591,332

(22) Filed: Feb. 29, 2024

(65) Prior Publication Data

US 2024/0338431 A1      Oct. 10, 2024

Related U.S. Application Data

(60) Provisional application No. 63/457,112, filed on Apr. 4, 2023.

(51) Int. Cl.
G06F 21/32 (2013.01)
(52) U.S. Cl.
CPC ..................................... G06F 21/32 (2013.01)
(58) Field of Classification Search
CPC ....................................................... G06F 21/32
See application file for complete search history.

(56) References Cited

U.S. PATENT DOCUMENTS

| | | | |
|---|---|---|---|
| 8,381,969 B1 | 2/2013 | Miller et al. | |
| 8,423,462 B1 | 4/2013 | Amacker et al. | |
| 8,521,131 B1 | 8/2013 | Ramalingam et al. | |
| 8,744,966 B1 | 6/2014 | Amacker et al. | |
| 8,965,170 B1 | 2/2015 | Benea | |
| 9,107,064 B1 | 8/2015 | Ramalingam et al. | |
| 9,166,961 B1 | 10/2015 | Johansson et al. | |
| 9,202,105 B1 | 12/2015 | Wang et al. | |
| 9,324,098 B1 | 4/2016 | Agrawal et al. | |
| 9,386,507 B1 | 7/2016 | Ramalingam et al. | |
| 9,607,138 B1 | 3/2017 | Baldwin et al. | |
| 9,609,577 B1 | 3/2017 | Ramalingam et al. | |
| 9,681,350 B1 | 6/2017 | Marupaduga et al. | |
| 9,681,359 B2 | 6/2017 | Ramalingam et al. | |
| 9,723,131 B1 | 8/2017 | Ramalingam et al. | |
| 9,836,642 B1 | 12/2017 | Ramaswamy | |
| 9,934,504 B2 | 4/2018 | Wang et al. | |
| 9,967,250 B2 | 5/2018 | Johansson et al. | |
| 10,027,662 B1 | 7/2018 | Mutagi et al. | |

(Continued)

*Primary Examiner* — An T Nguyen
(74) *Attorney, Agent, or Firm* — Brownstein Hyatt Farber Schreck LLP

(57) ABSTRACT

Biometric gallery management at crowded venues involves using mobile devices to ascertain the most proximate people to a station that performs biometric identification. A preliminary identification of those people may be generated that enables biometric data for those most proximate people to be obtained from a main gallery. A local gallery may be populated from the main gallery using the preliminary identification. Biometric identification may be attempted to be performed using the local gallery. This may enable the local gallery to be sufficiently small so as to increase speed and accuracy of biometric identification while ensuring that the most likely biometric data needed for biometric identifications is available in the local gallery since the associated people are those most proximate to the station that will perform the biometric identification.

20 Claims, 8 Drawing Sheets

(56)　　　　　　References Cited

U.S. PATENT DOCUMENTS

| | | | |
|---|---|---|---|
| 10,055,740 B2 | 8/2018 | Hanson et al. | |
| 10,104,181 B1 | 10/2018 | Rao et al. | |
| 10,108,791 B1 | 10/2018 | Masterman | |
| 10,108,961 B2 | 10/2018 | Wang et al. | |
| 10,122,727 B2 | 11/2018 | Johansson et al. | |
| 10,235,669 B2 | 3/2019 | Amacker et al. | |
| 10,242,364 B2 | 3/2019 | Wang et al. | |
| 10,243,945 B1 | 3/2019 | Kruse et al. | |
| 11,151,481 B1 | 10/2021 | Sun et al. | |
| 11,527,101 B1 * | 12/2022 | Wisniewski | G06V 40/1365 |
| 2004/0221303 A1 | 11/2004 | Sie | |
| 2014/0189720 A1 | 7/2014 | Terrazas | |
| 2015/0294515 A1 | 10/2015 | Bergdale | |
| 2016/0189063 A1 | 6/2016 | Nie | |
| 2017/0188103 A1 | 6/2017 | Pan | |
| 2018/0007060 A1 | 1/2018 | Leblang et al. | |
| 2019/0036939 A1 | 1/2019 | Johansson et al. | |
| 2019/0050631 A1 | 2/2019 | Hayase | |

* cited by examiner

*200*

USE MOBILE DEVICES TO ASCERTAIN MOST
PROXIMATE PEOPLE TO STATION — 210

GENERATE PRELIMINARY IDENTIFICATIONS
OF MOST PROXIMATE PEOPLE USING MOBILE
DEVICES — 220

POPULATE LOCAL GALLERY FROM MAIN
GALLERY WITH BIOMETRIC DATA FOR MULTIPLE
PEOPLE USING PRELIMINARY IDENTIFICATIONS — 230

BIOMETRIC GALLERY MANAGEMENT AT CROWDED VENUES

CROSS-REFERENCE TO RELATED APPLICATION(S)

This application is a nonprovisional patent application of and claims the benefit of U.S. Provisional Patent Application No. 63/457,112, filed Apr. 4, 2023 and titled "Biometric Gallery Management at Crowded Venues," the disclosure of which is hereby incorporated herein by reference in its entirety.

FIELD

The described embodiments relate generally to biometrics. More particularly, the present embodiments relate to biometric gallery management at crowded venues.

BACKGROUND

Biometric identification systems may identify people using biometrics. Biometrics may include fingerprints, palm prints, irises, eyes, faces, voices, gaits, pictures, or other identifying characteristics about a person. A biometric identification system may capture information about a biometric using a biometric reader and identify a person by comparing the captured information against stored information. For example, an image sensor may capture an image of a fingerprint and compare the image of the fingerprint against stored fingerprint images.

SUMMARY

The present disclosure relates to biometric gallery management at crowded venues. Mobile devices may be used to ascertain the most proximate people to a station that performs biometric identification. A preliminary identification of those people may be generated that enables biometric data for those most proximate people to be obtained from a main gallery. A local gallery may be populated from the main gallery using the preliminary identification. Biometric identification may be attempted to be performed using the local gallery. This may enable the local gallery to be sufficiently small so as to increase speed and accuracy of biometric identification while ensuring that the most likely biometric data needed for biometric identifications is available in the local gallery since the associated people are those most proximate to the station that will perform the biometric identification.

In various embodiments, a system for biometric gallery management at crowded events includes a station with a non-transitory storage medium that stores instructions and a processor. The processor executes the instructions to use mobile devices to ascertain most proximate people to the station, generate preliminary identifications of the most proximate people using the mobile devices, populate a local gallery from a main gallery with biometric data for the most proximate people using the preliminary identifications, and attempt to perform a biometric identification using the local gallery.

In some examples, the processor generates the preliminary identifications by communicating with an identification system device. In a number of implementations of such examples, the processor transmits information received from the mobile devices to the identification system device. In various implementations of such examples, the processor receives the information from apps associated with the identification system device that are executing on the mobile devices. In some implementations of such examples, the processor receives the biometric data from the identification system device.

In a number of examples, the processor uses the mobile devices to ascertain a maximum number of the most proximate people. In various examples, the processor attempts to use the main gallery to perform the biometric identification upon failure of the attempt to perform the biometric identification using the local gallery.

In some embodiments, a system for biometric gallery management at crowded events includes a non-transitory storage medium that stores instructions and a processor. The processor executes the instructions to use mobile devices to ascertain most proximate people to a station, generate preliminary identifications of the most proximate people using the mobile devices, populate a local gallery from a main gallery with biometric data for the most proximate people using the preliminary identifications, and exclude a person of the most proximate people from the local gallery.

In a number of examples, the processor excludes the person because the person has been one of the most proximate people for more than a threshold time. In various examples, the processor excludes the person because the person is in an employee gallery. In some examples, the processor excludes the person by removing a portion of the biometric data corresponding to the person from the local gallery. In a number of examples, the processor excludes the person by omitting adding corresponding data for the person to the local gallery.

In various examples, the station attempts to perform a biometric identification using the local gallery and, upon failure of the attempt to perform the biometric identification using the local gallery, attempts to use an exclusion gallery that includes data for the person to perform the biometric identification. In some implementations of such examples, the processor, upon the failure of the attempt to perform the biometric identification using the exclusion gallery, attempts to use the main gallery to perform the biometric identification.

In a number of embodiments, a system for biometric gallery management at crowded events includes a non-transitory storage medium that stores instructions and a processor. The processor executes the instructions to use mobile devices to ascertain most proximate people to a station; generate preliminary identifications of the most proximate people using the mobile devices; populate a local gallery from a main gallery with biometric data for the most proximate people using the preliminary identifications; and in response to detecting that the most proximate people have changed, modify the local gallery so that the biometric data corresponds to currently detected most proximate people.

In various examples, the processor performs an action using identity information associated with a person that the processor accesses upon biometrically identifying the person using the local gallery. In some implementations of such examples, the action includes controlling access to an area.

In a number of examples, the system further includes a communication unit that the processor uses to communicate with the mobile devices. In some examples, the biometric data includes images of at least a portion of faces. In various examples, the main gallery includes additional biometric data corresponding to additional people.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
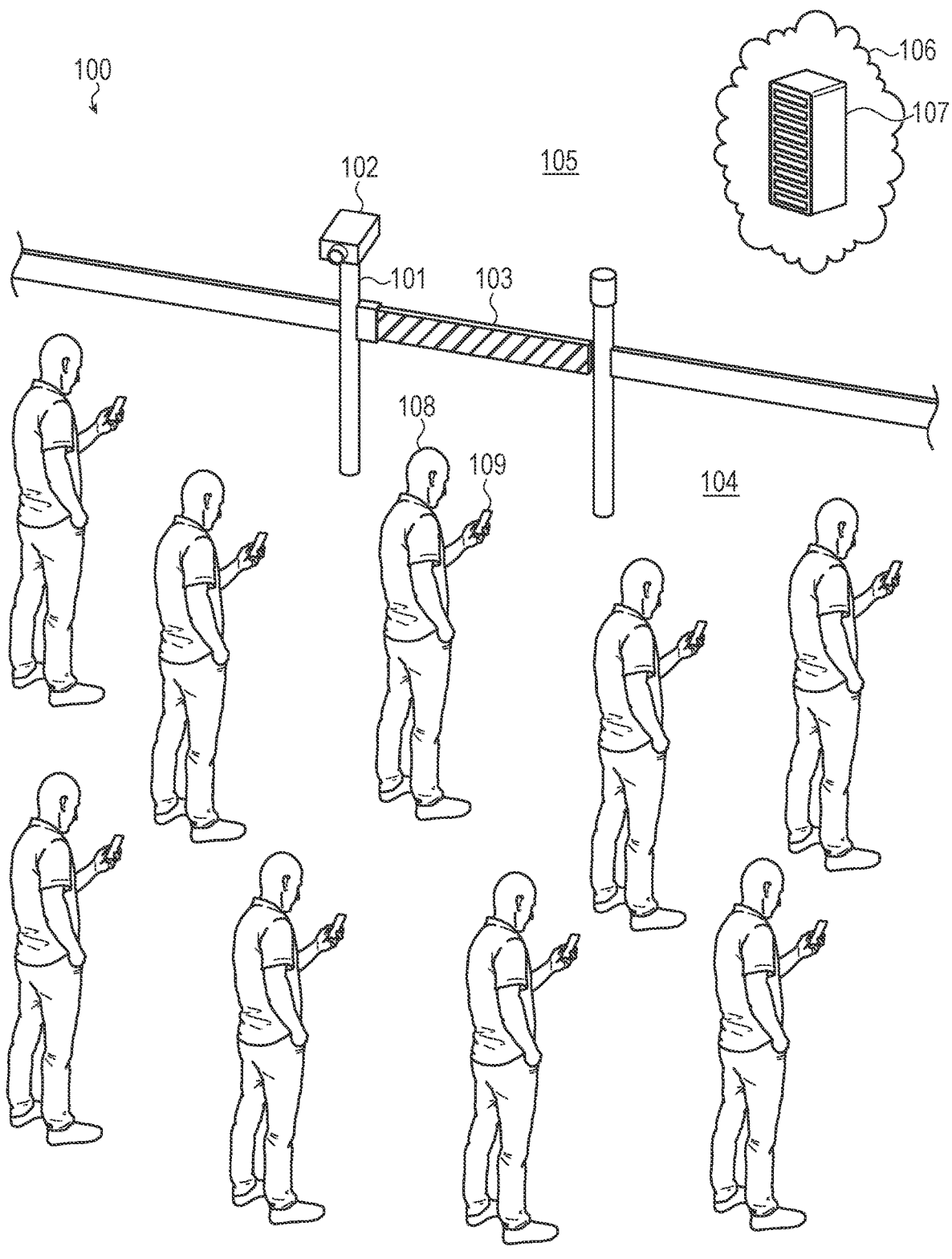
FIG. 1 depicts an example system for biometric gallery management at crowded venues.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

Speed and/or accuracy of biometric identification may be dependent upon the size of the biometric gallery (gallery of biometric data to which an obtained digital representation of a biometric is compared to perform the biometric identification). For example, the larger the biometric gallery, the more time and/or hardware and/or software resources that may be used to perform the biometric identification. Further, the larger the biometric gallery, the more of the biometric gallery of biometric data may be sufficiently similar to the obtained digital representation of the biometric such that certainty in the biometric identification decreases.

In some cases, the biometric gallery may be managed such that the digital representation of the biometric is compared to a subset of the biometric gallery instead of the entire biometric gallery. For example, a subset of a population corresponding to the biometric gallery may be determined to be likely to visit a venue during a particular time frame. A subset gallery may be generated from the biometric gallery corresponding to the subset. Comparisons for biometric identification may be made first to the subset gallery and, upon failure of that comparison, to the biometric gallery. This may improve speed and accuracy of biometric identification.

However, this may still be insufficient for crowded venues, such as venues where tens of thousands of people, hundreds of thousands of people, or more people may attend. Biometric identification using a biometric gallery corresponding to tens of thousands of people, hundreds of thousands of people, or more people may be too slow and/or inaccurate.

In some embodiments discussed herein, biometric galleries may be managed using wireless identifiers. In the context of the present application, a "wireless identifier" may be an address, name, or other structure that uniquely identifies an electronic device (such as a mobile device) or communication component thereof in wireless communication. Examples of wireless identifiers may include one or more Bluetooth™ identifiers, Bluetooth™ Low Energy or LE identifiers, cellular identifiers, Wi-Fi identifiers, Ethernet identifiers, Near-field communication identifiers, media access control address identifiers, and so on. Use of wireless identifiers to manage biometric galleries is discussed in detail below.

Embodiments discussed herein may generally apply to two types of biometric matching, namely "verification" matching and "identification" matching. Verification matches may be made to determine a person's identity from among a group of known people culled from a larger pool, while identification matches may be made to determine an individual's identity from the larger pool itself (e.g., rather than against a subset of the pool, as in verification).

Verification may assume knowledge of the person presenting themselves, and may verify his or her identity using biometric matching. This process may use a small number of potential matches, as the verification process itself may deeply narrow down the potential matching candidates in advance. This is referred to as 1-to-1 or 1-to-few matching, where "few" may mean a relatively small pool of potential candidates to match against, such as less than 20. Verification may be a useful biometric matching solution when there is some knowledge introduced at the exact time of the biometric match, like an identification card with a name or other personal identifier.

In these cases, a workflow may include a) presenting an identification token with a personal identifier on it, b) reading the personal identifier and querying a biometric repository to identify potential matches, c) performing a biometric match against the returned potential matches, and d) responding with a match result. One example of this type of use may be when a person puts their ATM card in a bank machine, and the bank ATM then takes a photo of their face and compares it to the registered face associated with the accounts associated with the presented ATM card. In that case, the facial recognition matching is only comparing the photo to the faces associated with that account, not all faces for all accounts registered at that bank.

Identification may assume no advanced knowledge of who is presenting themselves to be identified. This process may be referred to as 1-to-many or 1-to-n. Identification operations may be much more complex than verification operations, as they may rely on using the biometrics themselves, and they may search against the entire gallery of enrolled individuals, which may measure into the hundreds of millions of identities.

The process of doing 1-to-many identifications against a group of biometrically enrolled individuals may consist of the following steps:

1. Build a "gallery" of enrollment templates. A gallery may be a set of biometric templates for enrolled individuals. Each template may be associated with an enrolled identity. A template may be a binary string that is produced by running an algorithm against a biometric image (e.g., fingerprint, iris, face, and so on).
2. Place the gallery in an infrastructure that has a matching algorithm. If the gallery size is large, this infrastructure may be very large, as measured by the number of servers or core processes that may run in parallel to handle large gallery size or concurrent identification requests.
3. As probe images are sent to the matching infrastructure, the matching algorithm may attempt to find an identity within some acceptable matching threshold. A probe image may be an image taken at the time an individual is to be biometrically identified. It may be turned into a probe template using the same or similar logic to create gallery templates, and that probe template may be introduced to the matching algorithm and may produce match results.

Challenges to overcome with biometric matching solutions may include 1) accuracy, 2) latency, and 3) throughput.

Accuracy may be determined by a measure of False Positive Rate (FPR) and False Negative Rate (FNR). A given matching algorithm may have defined rates of these measures, and they may be variable based on the number of templates in the gallery. As the gallery grows, it may be challenging to keep the accuracy stable, perhaps even high.

Latency may mean the time it takes for a single identification operation, and throughput may mean how many identifications can be done within a given period of time. A given matching algorithm may be optimized for (or may generally address) one or both of these measures.

Some biometrics, by their very nature, may be faster or more accurate than others. Likewise, some biometrics may be slower or less accurate than others. Entities that choose to implement biometric identification may take many factors into account as to which biometrics they want to consider.

Some major factors to consider may include importance of accurate identification, user experience, timeliness of response, and cost of infrastructure.

More mature and "high-touch" biometric matching solutions, like fingerprints and irises, may deliver high accuracy and speed with smaller cost to infrastructure, but may deliver such results at the expense of user experience. The biometrics may operate within a well-defined set of quality and acceptance criteria, and the biometric capture devices may be specialized to capture only good images under ideal sets of conditions.

Newer "low-touch" biometric matching solutions, like facial recognition, may deliver a very desirable user experience, but may deliver such at the cost of accuracy, speed, and cost to infrastructure. The biggest challenge with some of the "low-touch" biometric matching solutions may be that they are impacted by many more external factors that may impact results, lighting for facial recognition, for example. The combination of both less mature matching algorithms as well as the high level of deviation of biometric images for the same identity because of external conditions may lead to a significant impact in both accuracy and speed for these "low-touch" biometrics. This accuracy drop-off may become very relevant as the size of the gallery grows. In some facial recognition matching algorithms, a gallery size of 50,000 may be where accuracy begins to degrade dramatically to the point of becoming useless. This may be extremely limiting when a desired gallery size of 100 million is desired for an identification operation.

In order to improve accuracy, latency, and/or throughput, the present disclosure may generate one or more subset galleries or "local galleries" from the gallery, which may be designated the "main gallery." Such a local gallery may store a portion of the digital representations of biometrics and/or other biometric information stored by the main gallery. As such, performing biometric matching against the local gallery may be more accurate, may have lower latency, and/or may have higher throughput than matching against the main gallery. Biometric matching against the local gallery that is unsuccessful may failover into matching against the main gallery (and/or one or more local galleries where one or more local galleries are created, such as different subsets of the main gallery).

In the context of this disclosure, terms such as "biometric information," "biometric data," "information about biometrics," "data regarding biometrics," and/or similar terms may refer to any kind of information related to biometrics. This may include, but is not limited to, full and/or partial images of biometrics, digital representations of biometrics, hashes, encodings of biometrics, and/or any other digital or other data structure that may indicate and/or store information regarding one or more biometrics.

The local gallery may be stored in a storage device that is faster to access than the main gallery, such as on a more quickly accessible storage device (such as on a memory or cache versus a hard drive or other longer term storage), on a closer device that has less network latency and/or does not require network communication (such as on a device that performs the biometric matching versus one or more servers and/or server allocations with which the device that performs the biometric matching communicates), and so on. Alternatively, the local gallery and main gallery may be stored on the same storage device and/or device and the improvement to accuracy, latency, and/or throughput may come from performing biometric matching against the relatively smaller size of the local gallery versus the main gallery.

The accuracy, latency, and/or throughput of performing biometric matching against the local gallery versus the main gallery may be greatly improved when it is more likely than not that the digital representations of biometrics corresponding to the biometric matching are stored in the local gallery. If it is not more likely than not that the digital representations of biometrics corresponding to the biometric matching are stored in the local gallery, then performing biometric matching against the local gallery versus the main gallery may frequently end up performing biometric matching against both the local gallery and the main gallery without improving accuracy, latency, and/or throughput. The likelihood that the digital representations of biometrics corresponding to the biometric matching are stored in the local gallery may be greatly improved via biometric gallery management using wireless identifiers.

As discussed above, biometric identification using a biometric gallery corresponding to tens of thousands of people, hundreds of thousands of people, or more people may be too slow and/or inaccurate. This may be overcome by ascertaining the most proximate people to a station that performs biometric identification, generating a preliminary identification of those people that enables biometric data for those most proximate people to be obtained from a main gallery, populating a local gallery from the main gallery using the preliminary identification, and attempting to perform the biometric identification using the local gallery. This may enable the local gallery to be sufficiently small so as to increase speed and accuracy of biometric identification while ensuring that the most likely biometric data needed for biometric identifications is available in the local gallery since the associated people are those most proximate to the station that will perform the biometric identification.

The issue then becomes how to ascertain the most proximate people to the station. This may be performed by using mobile devices, such as cellular telephones, tablet computing devices, laptop computing devices, wearable devices, and/or other mobile electronic devices. People may be carrying and/or otherwise associated with such mobile devices. Presence of these mobile devices may be determined using information transmitted by and/or otherwise obtained from such mobile devices. Correspondence of these mobile devices to people may then be determined, preliminarily identifying the people. Biometric data corresponding to those people may then be located in the main gallery.

For example, a station or other device may be able to obtain one or more wireless identifiers that correspond to one or more mobile devices in an area proximate to the station. Presence of such a mobile device in the area proximate to the station may indicate that a person carrying and/or otherwise associated with the mobile device may be approaching the station. In order to facilitate this, associations between wireless identifiers and digital representations of biometrics may be generated and stored. For example, wireless identifiers detected as present when a digital representation of a biometric is received may be determined to be associated. Wireless identifiers that are determined to be coincidentally present (i.e., carried not by the person corresponding to the digital representation of the biometric but to another person present while the person corresponding to the digital representation of the biometric provides the digital representation of the biometric) may not be associated, and wireless identifiers that are determined to be associated and are later determined to have been coincidentally present (or are later determined to no longer be associated, are requested to be removed, and so on) may have their associations removed.

Alternatively and/or additionally, an app and/or application executing on the mobile device may provide an identifier associated with the mobile device and/or a person associated with the mobile device (such as a name, wireless identifier, personal identification number, and so on), whether on the mobile device's own initiative and/or in response to a query from the station. For example, the app and/or application may be one associated with an identification system that is associated with the station. The identifier may enable preliminary identification of the person, and/or of the mobile device (which then may be used to preliminarily identify the person).

The present disclosure relates to biometric gallery management at crowded venues. Mobile devices may be used to ascertain the most proximate people to a station that performs biometric identification. A preliminary identification of those people may be generated that enables biometric data for those most proximate people to be obtained from a main gallery. A local gallery may be populated from the main gallery using the preliminary identification. Biometric identification may be attempted to be performed using the local gallery. This may enable the local gallery to be sufficiently small so as to increase speed and accuracy of biometric identification while ensuring that the most likely biometric data needed for biometric identifications is available in the local gallery since the associated people are those most proximate to the station that will perform the biometric identification.

This may allow performance of functions that were previously not performable and enables more efficiency while expending less work, eliminating unnecessary hardware and/or other components, and more efficiently using hardware, software, network, and/or other resources. This may improve the operation of systems involved by reducing unnecessary components, increasing the speed at which the systems perform operations, and/or reducing consumption of hardware, software, network, and/or other resources.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 depicts an example system 100 for biometric gallery management at crowded venues. The system 100 includes a station 101. The station 101 may perform biometric identifications using one or more biometric reader devices 102, such as part of determining whether people 108 may be permitted to move from a first area 104 (such as an unsecured area) at a venue or other location to a second area 105 (such as a secured area) at the venue or other location. For example, the station 101 may be used to control an automated gate 103 that restricts admittance from an unticketed area to a ticketed area based on whether or not identified people are associated with purchased tickets.

To increase speed and/or accuracy of biometric identification, a local gallery of biometric data may be generated from a main gallery of biometric data corresponding to people who are likely to visit the venue or other location, such as ticket holders. Such a main biometric gallery may be stored by one or more identification system devices 107 located at an area 106 that may be the first area 104, the second area 105, and/or another area that may be the venue or other location, located remote to the venue or other location, and so on. However, tens of thousands of people, hundreds of thousands of people, or more people may be likely to visit the venue or other location.

As discussed above, biometric identification using a biometric gallery corresponding to tens of thousands of people, hundreds of thousands of people, or more people may be too slow and/or inaccurate. This may be overcome by the station 101 and/or another device ascertaining the most proximate people 108, generating a preliminary identification of those people 108 that enables biometric data for those most proximate people 108 to be obtained from a main gallery, populating a local gallery from the main gallery using the preliminary identification, and attempting to perform the biometric identification using the local gallery. This may enable the local gallery to be sufficiently small so as to increase speed and accuracy of biometric identification while ensuring that the most likely biometric data needed for biometric identifications is available in the local gallery since the associated people are those most proximate to the station 101 that will perform the biometric identification.

The issue then becomes how the station 101 ascertains the most proximate people 108. This may be performed by using mobile devices 109, such as cellular telephones, tablet computing devices, laptop computing devices, wearable devices, and/or other mobile electronic devices. People 108 may be carrying and/or otherwise associated with such mobile devices 109. Presence of these mobile devices 109 may be determined using information transmitted by and/or otherwise obtained from such mobile devices 109. Correspondence of these mobile devices 109 to people 108 may then be determined, preliminarily identifying the people 108. Biometric data corresponding to those people 108 may then be located in the main gallery.

For example, the station 101 may be able to obtain one or more wireless identifiers that correspond to one or more mobile devices 109 in an area proximate to the station 101, such as the first area 104 and/or the second area 105. Presence of such a mobile device 109 in the area proximate to the station 101 may indicate that a person 108 carrying and/or otherwise associated with the mobile device 109 may be approaching the station 101. In order to facilitate this, associations between wireless identifiers and digital representations of biometrics may be generated and stored. For example, wireless identifiers detected as present when a digital representation of a biometric is received may be determined to be associated. Wireless identifiers that are determined to be coincidentally present (i.e., carried not by the person 108 corresponding to the digital representation of the biometric but to another person 108 present while the person corresponding to the digital representation of the biometric provides the digital representation of the biometric) may not be associated, and wireless identifiers that are determined to be associated and are later determined to have been coincidentally present (or are later determined to no longer be associated, are requested to be removed, and so on) may have their associations removed.

Alternatively and/or additionally, an app and/or application executing on the mobile device 109 may provide an identifier associated with the mobile device 109 and/or a person 108 associated with the mobile device 109 (such as a name, wireless identifier, personal identification number, and so on), whether on the mobile device's 109 own initiative and/or in response to a query from the station 101 and/or another device. For example, the app and/or application may be one associated with an identification system that is associated with the station 101. The identifier may enable preliminary identification of the person 108, and/or of the mobile device 109 (which then may be used to preliminarily identify the person 108).

In other words, in some embodiments, mobile devices 109 may be used to ascertain the most proximate people 108 to the station 101. A preliminary identification of those people 108 may be generated that enables biometric data for those most proximate people 108 to be obtained from a main gallery. A local gallery may be populated from the main gallery using the preliminary identification. Biometric identification may be attempted to be performed using the local gallery. This may enable the local gallery to be sufficiently small so as to increase speed and accuracy of biometric identification while ensuring that the most likely biometric data needed for biometric identifications is available in the local gallery since the associated people are those most proximate to the station 101 that will perform the biometric identification.

Subsequently, the station 101 may use the biometric reader device 102 to obtain a digital representation of a biometric from one or more of the people 108. The station 101 (and/or the identification system device 107) may attempt to perform a biometric identification by comparing the digital representation to the local gallery. If successful, the station 101 (and/or the identification system device 107) may use identity information associated with the identified person 108 and/or biometric data associated with the identified person 108 to determine whether or not to allow the identified person 108 to move to the second area 105 (and/or for other purposes). If unsuccessful, the station 101 may attempt to perform a biometric identification by comparing the digital representation to the one or more other galleries, such as the main gallery. Various configurations are possible and contemplated without departing from the scope of the present disclosure.

This may allow performance of functions that were previously not performable and enables more efficiency while expending less work, eliminating unnecessary hardware and/or other components, and more efficiently using hardware, software, network, and/or other resources. This may improve the operation of systems involved by reducing unnecessary components, increasing the speed at which the systems perform operations, and/or reducing consumption of hardware, software, network, and/or other resources.

In various examples, the station may generate the preliminary identifications. In some such examples, the station may generate the preliminary identifications by communicating with the identification system device 107. By way of illustration, the station 101 may transmit information received from the mobile devices 109 and/or one or more apps or applications (which may be associated with the identification system device 107) that are executing on the mobile devices 109. The station 101 may receive a response to such a transmission, such as receiving biometric data (directly and/or indirectly) from the identification system device 107.

In some examples, the station 101 may use the mobile devices 109 to ascertain a maximum number of the most proximate people. The maximum number may correspond to a maximum size for the local gallery that balances increases in speed and accuracy obtained from small gallery size with possible decreases in speed caused by failed identifications attempted to be performed using the local gallery due to corresponding biometric data not being located in the local gallery. Such a maximum number may be twenty people, fifty people, and so on. Such a maximum number may be changed over time, such as due to changes in speed and/or accuracy of identifications, numbers of failed identifications attempted to be performed using the local gallery due to corresponding biometric data not being located in the local gallery, and so on.

In some situations, some of the people 108 may be excluded from the most proximate people. These may be people 108 who may not need to be biometrically identified. By excluding such people, room may be saved in the local gallery for other people 108 who may need to be biometrically identified.

By way of illustration, people 108 who are present for more than a threshold period of time (such as five minutes, ten minutes, a half hour, and so on) may be proximate for reasons other than entering the second area 105 and may not approach the station 101 for biometric identification. Such people 108 may be determined and may be excluded from the local gallery, have their biometric data removed from the local gallery, may have their biometric data omitted from being added to the local gallery, and so on.

By way of another illustration, venue, identification system, security, and/or other employees who may be present may not need to be biometrically identified (and/or may not need to be biometrically identified for entry into the second area 105. In some examples, these employees may be determined by comparing a digital representation of a biometric for the employee to an employee gallery. Such employees may be determined and may be excluded from the local gallery, have their biometric data removed from the local gallery, may have their biometric data omitted from being added to the local gallery, and so on.

In some examples, people 108 excluded from the ascertained most proximate people may have their biometric data added to an exclusion gallery, such as an employee gallery, a gallery of people proximate for more than the threshold period of time, and so on. When a biometric identification fails using the local gallery, the biometric identification may be performed using the exclusion gallery. Success of this biometric identification may prevent an attempt to perform the biometric identification using one or more other biometric galleries, such as the main biometric gallery.

The most proximate people 108 may change over time. As the most proximate people 108 change, the local gallery may be modified so that the biometric data stored by the local gallery corresponds to currently detected most proximate people 108.

In some examples, the station 101 may perform an action using identity information associated with a person 108 that the station 101 accesses upon biometrically identifying the person 108 using the local gallery. The action may be controlling access to an area, such as the second area 105.

In various examples, the biometric reader device 102 may be a fingerprint scanner, a blood vessel scanner, a palm-vein scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and/or sensor that may be used to obtain one or more digital representations of one or more biometrics. The digital representations of the one or more biometrics may include one or more fingerprints, blood vessel scans, palm-vein scans, voiceprints, facial images, retina images, iris images, deoxyribonucleic acid sequences, heart rhythms, gaits, and so on.

In various examples, the station 101 may include one or more communication units that communicate with the mobile devices 109. In other examples, the station 101 may communicate with the mobile devices 109 using one or more other devices, such as one or more wireless beacons.

In some examples, an app and/or application executing on the mobile device 109 may provide an identifier directly to the station 101. Such an identifier may be contained in a data structure like a token. In other examples, the app and/or application executing on the mobile device 109 may provide an identifier to the station 101 via the identification system device 107, such as where the app and/or application executing on the mobile device 109 provides the identifier to the identification system device 107 based on a location detected by the mobile device 109. Various configurations are possible and contemplated without departing from the scope of the present disclosure.

Although the system 100 is illustrated and described with particular components that perform particular functions, it is understood that this is an example. Other implementations are possible and contemplated without departing from the scope of the present disclosure.

For example, the system 100 is shown in the context of the venue or other location that has a first area 104 and a second area 105. However, it is understood that this is an example. In other implementations, use of the techniques of the present disclosure may be used in other contexts without departing from the scope of the present disclosure.

Figure 2:
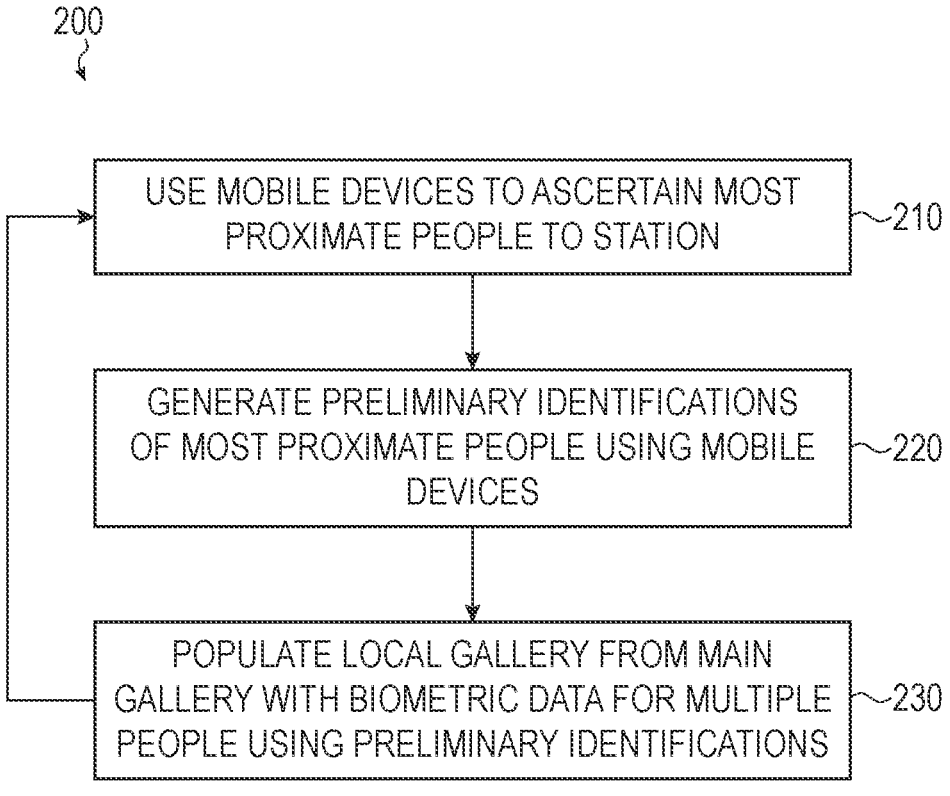
FIG. 2 is a flow chart illustrating a first example method for a biometric gallery management at crowded venues. The method may be performed by the system of FIG. 1.

FIG. 2 is a flow chart illustrating a first example method 200 for biometric gallery management at crowded venues. The method 200 may be performed by the system 100 of FIG. 1.

At operation 210, an electronic device (such as the station 101 and/or the identification system device 107 of FIG. 1)

may use one or more mobile devices to ascertain most proximate people to one or more stations. For example, a station or other device may be able to obtain one or more wireless identifiers that correspond to one or more mobile devices in an area proximate to the station. Alternatively and/or additionally, an app and/or application executing on the mobile device may provide an identifier associated with the mobile device and/or a person associated with the mobile device (such as a name, wireless identifier, personal identification number, and so on), whether on the mobile device's own initiative and/or in response to a query from the station.

At operation 220, the electronic device may generate one or more preliminary identifications of the most proximate people using the mobile devices. For example, the preliminary identifications may be generated by determining one or more people who are associated with the wireless identifiers and/or otherwise obtained from the mobile devices, and so on.

At operation 230, the electronic device may populate one or more local galleries from one or more main galleries with biometric data for multiple people using the preliminary identifications. For example, biometric data corresponding to the most proximate people may be populated to the local gallery and while the main gallery includes that biometric data as well as biometric data for additional people.

In various examples, this example method 200 may be implemented using a group of interrelated software modules or components that perform various functions discussed herein. These software modules or components may be executed within a cloud network and/or by one or more computing devices, such as the station 101 and/or the identification system device 107 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 may include one or more additional operations. Such additional operations may include attempting to perform a biometric identification using the local gallery, accessing identification information corresponding to a biometric identification, performing one or more actions using accessed identity information, and so on. Various configurations are possible and contemplated without departing from the present disclosure.

Figure 3:
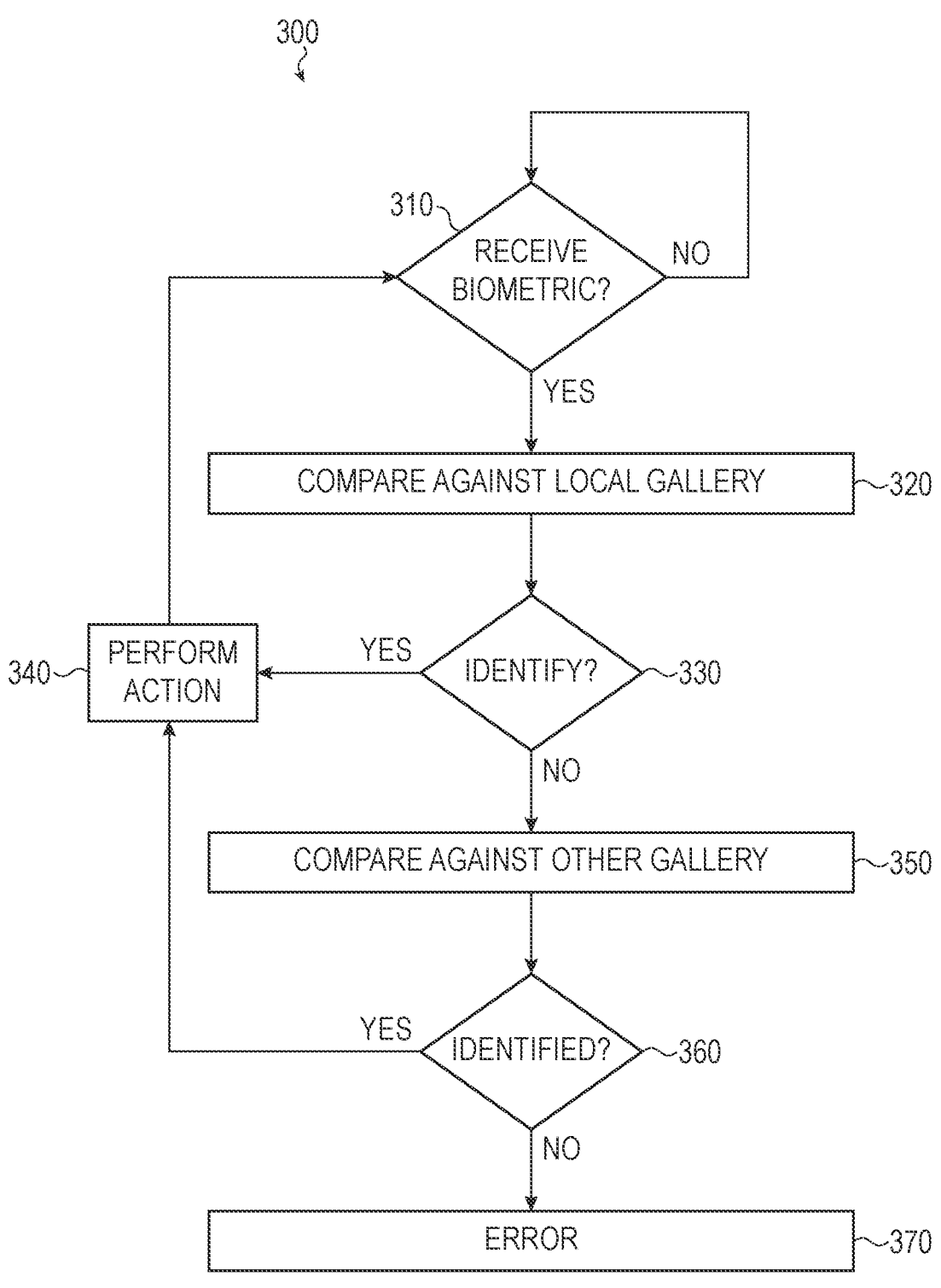
FIG. 3 is a flow chart illustrating an example method for biometric gallery performing actions using information obtained using biometric identifications. The method may be performed by the system of FIG. 1.

FIG. 3 is a flow chart illustrating an example method 300 for a biometric gallery performing actions using information obtained using biometric identifications. The method 300 may be performed by the system 100 of FIG. 1.

At operation 310, an electronic device (such as the station 101 and/or the identification system device 107 of FIG. 1) may determine whether or not one or more digital representation of one or more biometrics are received. If not, the flow may return to operation 310 where the electronic device may again determine whether or not one or more digital representation of one or more biometrics are received. Otherwise, the flow may proceed to operation 320.

At operation 320, the electronic device may compare the digital representation of the biometric against a local gallery. The local gallery may include biometric data for people determined to be most proximate to a location where the digital representation of the biometric is received.

At operation 330, the electronic device may determine whether or not a biometric identification is successful from comparing the digital representation of the biometric against the local gallery. If so, the flow may proceed to operation

340 where the electronic device performs one or more actions (such as one or more actions using identity data accessed using the biometric identification) before the flow returns to operation 310 where the electronic device may again determine whether or not one or more digital representations of one or more biometrics are received. Otherwise, the flow may proceed to operation 350.

At operation 350, the electronic device may compare the digital representation of the biometric against one or more other galleries. Such one or more other galleries may include a main gallery from which the local gallery was generated, one or more exclusion galleries associated with people excluded from the local gallery, and so on.

At operation 360, the electronic device may determine whether or not a biometric identification is successful from comparing the digital representation of the biometric against the one or more other galleries. If so, the flow may proceed to operation 340 where the electronic device performs one or more actions (such as one or more actions using identity data accessed using the biometric identification) before the flow returns to operation 310 where the electronic device may again determine whether or not one or more digital representations of one or more biometrics are received. Otherwise, the flow may proceed to operation 370.

At operation 370, the electronic device may determine that an error has occurred. In some examples, determination that an error has occurred may include prompting a person associated with the digital representation of the biometric to enroll in a biometric identification system, directing the person to an alternate screening, and so on.

In various examples, this example method 300 may be implemented using a group of interrelated software modules or components that perform various functions discussed herein. These software modules or components may be executed within a cloud network and/or by one or more computing devices, such as the station 101 and/or the identification system device 107 of FIG. 1.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as including operation 370. However, it is understood that this is an example. In various implementations, the method 300 may include an operation other than determining that an error occurred, such as performing an alternate identification process. Various configurations are possible and contemplated without departing from the scope of the present disclosure.

Figure 4:
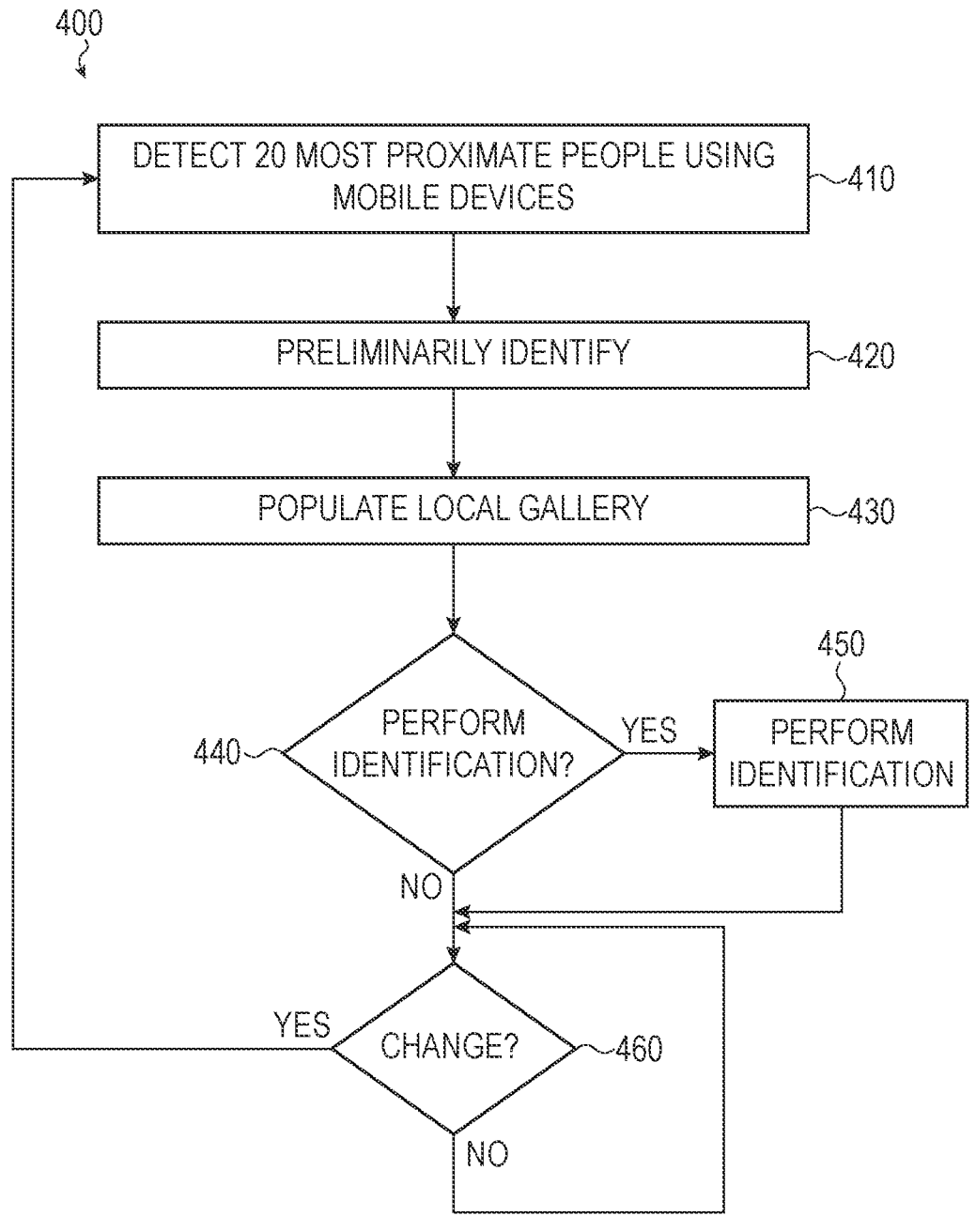
FIG. 4 is a flow chart illustrating a second example method for biometric gallery management at crowded venues. The method may be performed by the system of FIG. 1.

FIG. 4 is a flow chart illustrating a second example method 400 for biometric gallery management at crowded venues. The method 400 may be performed by the system 100 of FIG. 1.

At operation 410, an electronic device (such as the station 101 and/or the identification system device 107 of FIG. 1) may detect a number of the most proximate people using one or more mobile devices. In some examples, the number may be a number such as 20. In various examples, the number may be a maximum number. The electronic device may detect the number of most proximate people by receiving one or more identifiers from the one or more mobile devices.

At operation 420, the electronic device may preliminarily identify the most proximate people. For example, the electronic device may transmit the one or more identifiers to an identification system device to determine the one or more people associated with the one or more mobile devices that provided the one or more identifiers.

At operation 430, the electronic device may populate a local gallery with biometric data for the one or more people. The electronic device may obtain the biometric data from the identification system device, which may obtain the biometric data from a main gallery. The local gallery may be stored by the electronic device and/or one or more other devices, which may be located at a location that is remote to the electronic device.

At operation 440, the electronic device may determine whether or not to perform an identification, such as a biometric identification. For example, the electronic device may determine to perform a biometric identification upon receipt of a digital representation. If so, the flow may proceed to operation 450 where the electronic device may perform the identification. Otherwise, the flow may proceed to operation 460.

At operation 460, the electronic device may determine whether or not to change the most proximate people. The electronic device may determine to change the most proximate people in response to an expiration of an amount of time, upon receipt of one or more identifiers, performance of a threshold number of identifications (such as 20), and so on. If not, the flow may return to operation 460 where the electronic device may again determine whether or not to change the most proximate people. Otherwise, the flow may return to operation 410 where the electronic device may again detect the number of the most proximate people using one or more mobile devices.

In various examples, this example method 400 may be implemented using a group of interrelated software modules or components that perform various functions discussed herein. These software modules or components may be executed within a cloud network and/or by one or more computing devices, such as the station 101 and/or the identification system device 107 of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as separately preliminarily identifying the most proximate people and populating the local gallery. However, it is understood that this is an example. In various implementations, these operations may be performed as a single operation. Various configurations are possible and contemplated without departing from the scope of the present disclosure.

Figure 5:
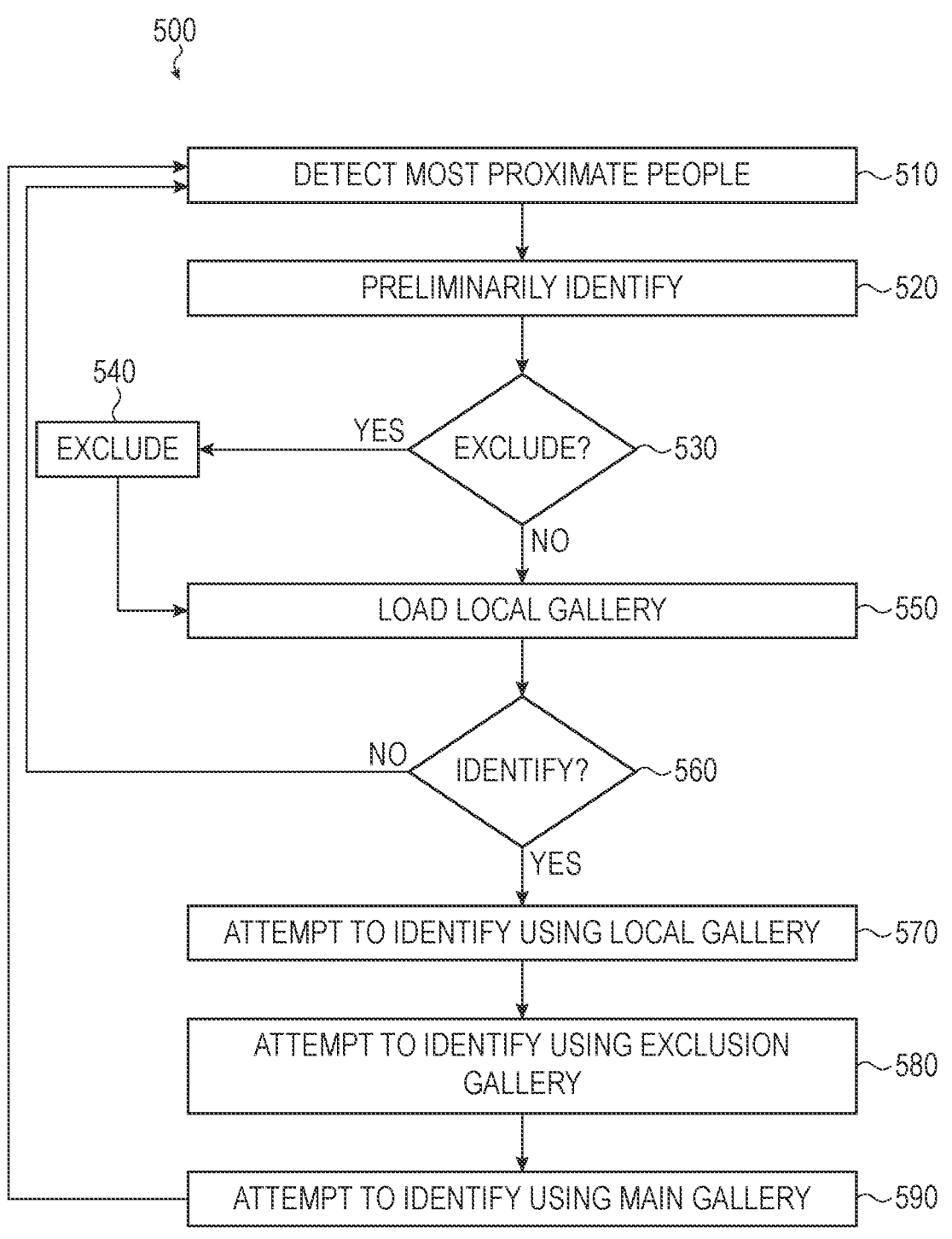
FIG. 5 is a flow chart illustrating a third example method for biometric gallery management at crowded venues. The method may be performed by the system of FIG. 1.

FIG. 5 is a flow chart illustrating a third example method 500 for biometric gallery management at crowded venues. The method 500 may be performed by the system 100 of FIG. 1.

At operation 510, an electronic device (such as the station 101 and/or the identification system device 107 of FIG. 1) may detect a number of most proximate people. At operation 520, the electronic device may preliminarily identify the most proximate people.

At operation 530, the electronic device may determine whether or not to exclude one or more of the most proximate people. For example, the electronic device may exclude one or more people who may not be likely to be subsequently biometrically identified. These may include people who have been proximate for more than a threshold amount of time, venue employees, identification system employees, and so on. If so, the flow may proceed to operation 540 where the electronic device may exclude the one or more people before the flow may proceed to operation 550 where the electronic device loads the local gallery with biometric data for the multiple people other than the excluded one or more people. Excluding the one or more people may include adding biometric data for the one or more people to an exclusion gallery. Otherwise, the flow may proceed directly to operation 560.

At operation 560, the electronic device may determine whether or not to perform an identification, such as a biometric identification. For example, the electronic device may determine to perform a biometric identification upon receipt of a digital representation. If so, the flow may proceed to operation 570. Otherwise, the flow may return to operation 510 where the electronic device may again detect the number of most proximate people.

At operation 570, after the electronic device determines to perform an identification, the electronic device may attempt to perform the identification using the local gallery. This may be unsuccessful and the flow may proceed to operation 580 where the electronic device may attempt to perform the identification using the exclusion gallery. This may be unsuccessful and the flow may proceed to operation 590, where the electronic device may attempt to perform the identification using the main gallery. The flow may then return to operation 510 where the electronic device may again detect the number of most proximate people.

In various examples, this example method 500 may be implemented using a group of interrelated software modules or components that perform various functions discussed herein. These software modules or components may be executed within a cloud network and/or by one or more computing devices, such as the station 101 and/or the identification system device 107 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as separately excluding the one or more people and loading the local gallery. However, it is understood that this is an example. In various implementations, these operations may be performed as a single operation. Various configurations are possible and contemplated without departing from the scope of the present disclosure.

By way of another example, the operations at 570 and 580 are shown as unsuccessful. However, it is understood that this is an example. If the operations at 570 or 580 are instead successful, the flow may instead return to operation 510 where the electronic device may again detect the number of most proximate people rather than proceeding to operations 580 or 590.

Figure 6:
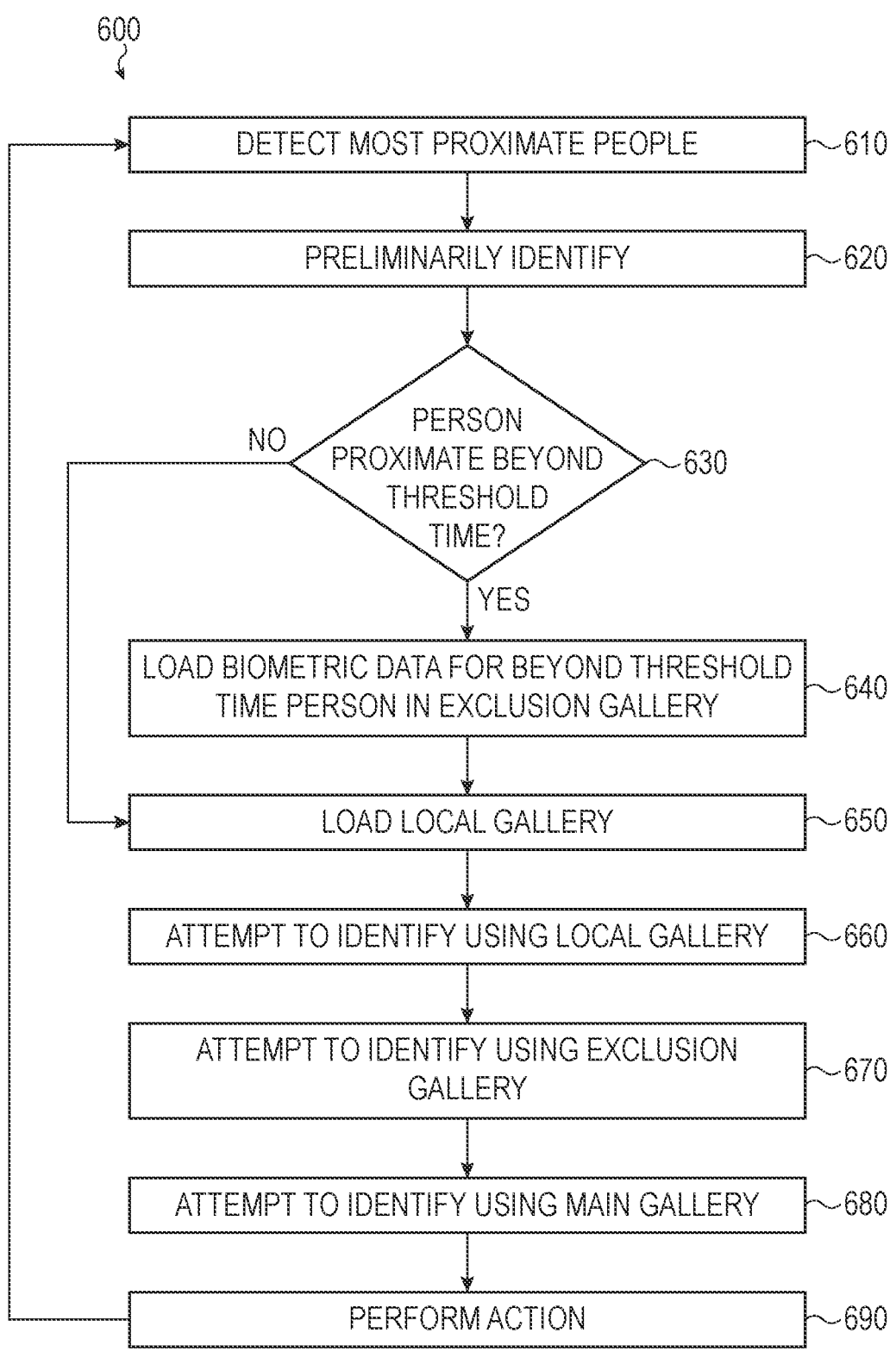
FIG. 6 is a flow chart illustrating a fourth example method for biometric gallery management at crowded venues. The method may be performed by the system of FIG. 1.

FIG. 6 is a flow chart illustrating a fourth example method 600 for biometric gallery management at crowded venues. The method 600 may be performed by the system 100 of FIG. 1.

At operation 610, an electronic device (such as the station 101 and/or the identification system device 107 of FIG. 1) may detect a number of most proximate people. At operation 620, the electronic device may preliminarily identify the most proximate people.

At operation 630, the electronic device may determine whether or not one or more people are proximate beyond a threshold period or other amount of time. If not, the flow may proceed to operation 650 where the electronic device may load the local gallery. Otherwise, the flow may proceed to operation 640 where the electronic device may load biometric data for the one or more people in an exclusion gallery before the flow proceeds to operation 650 where the electronic device may load the local gallery without the biometric data for the one or more people.

At operation 660, the electronic device may attempt to perform an identification using the local gallery. This may be unsuccessful and the flow may proceed to operation 670 where the electronic device may attempt to perform the identification using the exclusion gallery. This may be unsuccessful and the flow may proceed to operation 680, where the electronic device may attempt to perform the identification using the main gallery.

The flow may then proceed to operation 690 where the electronic device may perform an action associated with the identification, such as using identity information accessed using the identification. Such an action may include determining whether or not to allow a person access to an area, initiating a biometric payment, and so on. The flow may then return to operation 610 where the electronic device may again detect the number of most proximate people.

In various examples, this example method 600 may be implemented using a group of interrelated software modules or components that perform various functions discussed herein. These software modules or components may be executed within a cloud network and/or by one or more computing devices, such as the station 101 and/or the identification system device 107 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as loading the local gallery without biometric data for the one or more people. However, it is understood that this is an example. In various implementations, the biometric data for the one or more people may instead be removed from the local gallery. Various configurations are possible and contemplated without departing from the scope of the present disclosure.

By way of another example, the operations at 660 and 670 are shown as unsuccessful. However, it is understood that this is an example. If the operations at 660 or 670 are instead successful, the flow may instead proceed to operation 690 where the electronic device performs the one or more actions rather than proceeding to operations 670 or 680.

Figure 7:
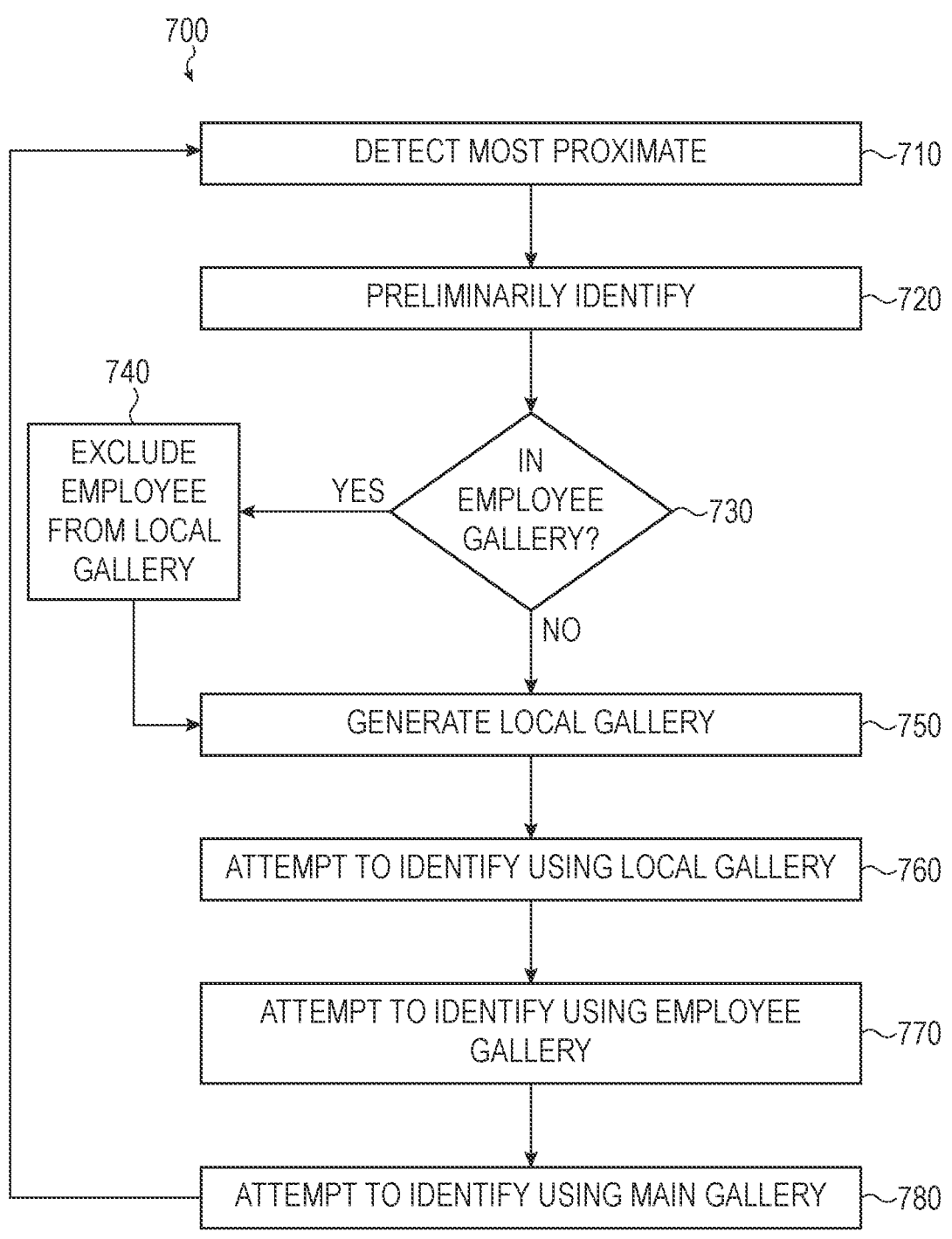
FIG. 7 is a flow chart illustrating a fifth example method for biometric gallery management at crowded venues. The method may be performed by the system of FIG. 1.

FIG. 7 is a flow chart illustrating a fifth example method 700 for biometric gallery management at crowded venues. The method 700 may be performed by the system 100 of FIG. 1.

At operation 710, an electronic device (such as the station 101 and/or the identification system device 107 of FIG. 1) may detect a number of most proximate people. At operation 720, the electronic device may preliminarily identify the most proximate people.

At operation 730, the electronic device may determine whether or not one or more of the most proximate people are included in an employee gallery. This may be performed by comparing the digital representations of the biometrics and/or identifiers received from one or more mobile devices to data in the employee gallery. If so, the flow may proceed to operation 740 where the electronic device may exclude the employee from the local gallery before the flow proceeds to operation 750 where the electronic device generates the local gallery. In other words, the electronic device may generate the local gallery without biometric data for the employee that the electronic device excluded. Otherwise, the flow may proceed directly to operation 750 where the electronic device may generate the local gallery without excluding any employees.

At operation 760, the electronic device may attempt to perform an identification using the local gallery. This may be unsuccessful and the flow may proceed to operation 770 where the electronic device may attempt to perform the identification using the employee gallery. This may be unsuccessful and the flow may proceed to operation 780, where the electronic device may attempt to perform the identification using the main gallery. The flow may then return to operation 710 where the electronic device may again detect the number of most proximate people.

In various examples, this example method 700 may be implemented using a group of interrelated software modules or components that perform various functions discussed herein. These software modules or components may be executed within a cloud network and/or by one or more computing devices, such as the station 101 and/or the identification system device 107 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as generating the local gallery after determining one or more employees to exclude. However, it is understood that this is an example. In various implementations, the electronic device may first generate the local gallery and then remove biometric data for one or more employees that the electronic device determines to exclude. Various configurations are possible and contemplated without departing from the scope of the present disclosure.

By way of another example, the operations at 760 and 770 are shown as unsuccessful. However, it is understood that this is an example. If the operations at 760 or 770 are instead successful, the flow may instead return to operation 710 where the electronic device may again detect the number of most proximate people rather than proceeding to operations 770 or 780.

Figure 8:
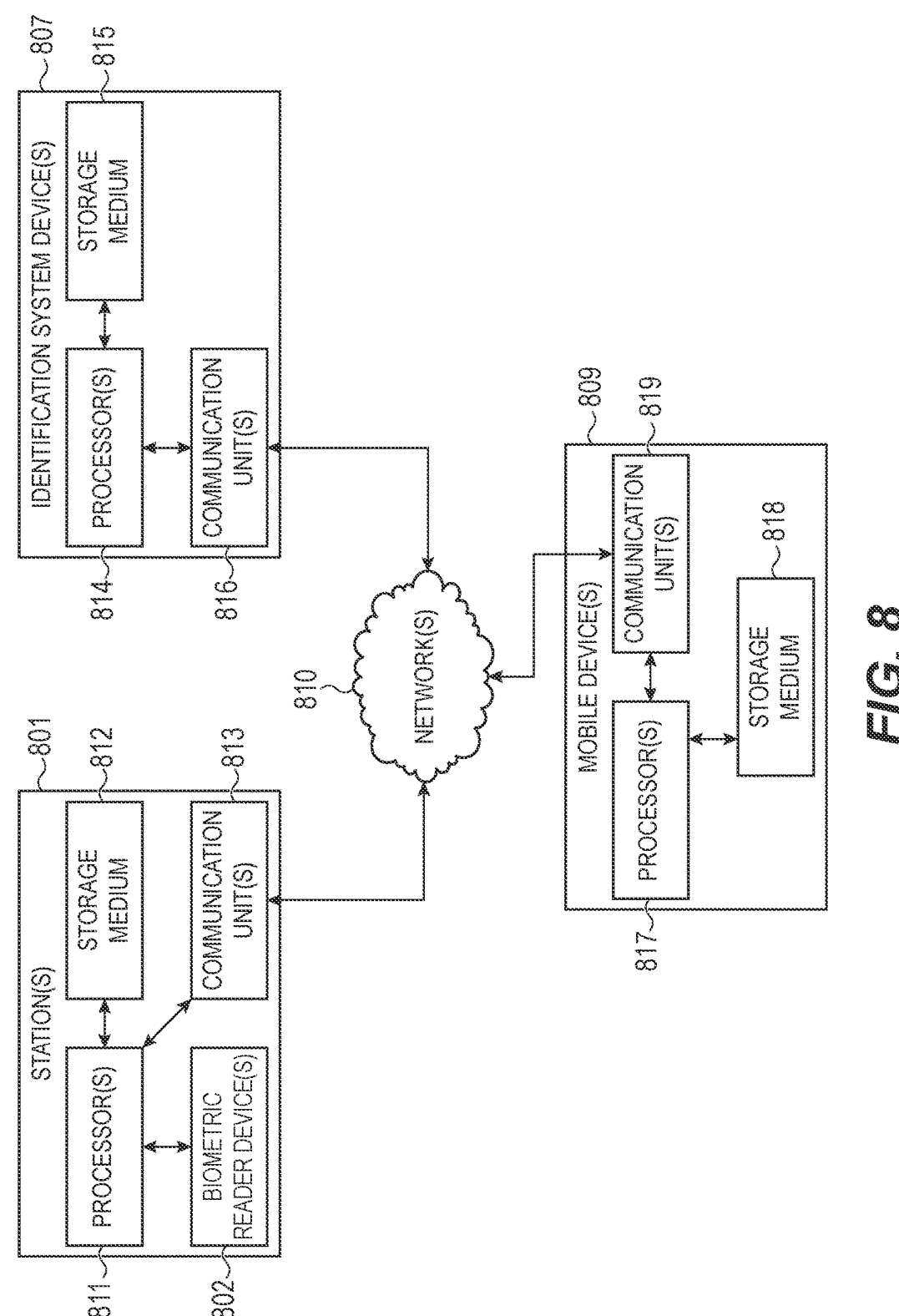
FIG. 8 depicts example relationships among example components that may be used to implement the system of FIG. 1.

FIG. 8 depicts example relationships among example components that may be used to implement the system 100 of FIG. 1. This may include one or more stations 801, identification system devices 807, and/or mobile devices 809 that may be operable to communicate with one or more of each other, whether directly and/or via one or more wired and/or wireless communication networks 810.

The identification system device 807 may store identity information (such as one or more names, addresses, telephone numbers, social security numbers, patient identification numbers or other identifiers, insurance data, financial data, health information (such as one or more temperatures, pupil dilation, medical diagnoses, immunocompromised conditions, medical histories, medical records, infection statuses, vaccinations, immunology data, results of antibody tests evidencing that a person has had a particular communicable illness and recovered, blood test results, saliva test results, and/or the like), and so on) associated with the identities of people (which may be verified identities, where the identities are verified as corresponding to the particular person named and/or where the identity information is verified as valid). Alternatively and/or additionally, some or all of the health information may be stored separately from the identity information but otherwise associated with the identity information, such as in a Health Insurance Portability and Accountability Act ("HIPAA") compliant or other data store or enclave. Such a data store or enclave may be stored on one or more different storage media than the identity information, or may be stored on the same storage medium or media and logically isolated from the identity information. The health information may be simultaneously and/or substantially simultaneously accessible as the identity information, such as where the identity information includes a health information identifier or key that may be used to access the separately stored health information. The identification system device 807 may control access to the identity information and/or the health information using identification information that is associated with the identity information. The identification information may include biometric data (which may include one or more digital representations of one or more fingerprints, blood vessel scans, palm-vein scans, voiceprints, facial images, retina images, iris images, deoxyribonucleic acid sequences, heart rhythms, gaits, and so on), one or more logins and/or passwords, authorization tokens, social media and/or other accounts, and so on. In various implementations, the identification system device 807 may allow the person associated with an identity to control access to the identity information, the health information, and/or other information (such as payment account information, health information (such as medical records, HIPAA protected information in order to be compliant with various legal restrictions, and so on), contact information, and so on. The identification system device 807 may control access to such information according to input received from the person. The identification system device 807 may be operable to communicate with the station 801 in order to handle requests to provide the identity information and/or the health information, update and/or otherwise add to the identity information and/or the health information, provide attestations regarding and/or related to the identity information and/or the health information (such as whether or not a person is of a particular age, whether or not a person has a particular license or insurance policy, whether or not a person has been monitored as having particular health information, whether or not a person has had a particular vaccination, whether or not an antibody test evidences that a person has had a particular communicable illness and recovered, whether or not a person has a particular ticket or authorization, whether or not a person has been monitored as having particular antibodies, whether or not a person has been assigned a particular medical diagnosis, and so on), evaluate health information stored in the identity information and/or otherwise associated with the identity information and/or other information stored in the identity information, perform transactions, allow or deny access, route one or more persons, and/or perform one or more other actions.

The identification system device 807 may be any kind of electronic device and/or cloud and/or other computing arrangement. Examples of such devices include, but are not limited to, one or more desktop computing devices, laptop computing devices, mobile computing devices, wearable devices, tablet computing devices, mobile telephones, kiosks and/or other stations, smart phones, printers, displays, vehicles, kitchen appliances, entertainment system devices, digital media players, and so on. The identification system device 807 may include one or more processors 814 and/or other processing units or controllers, communication units 816 (such as one or more network adapters and/or other devices used by a device to communicate with one or more other devices), non-transitory storage media 815, and/or other components. The processor 814 may execute one or more sets of instructions stored in the non-transitory storage media 815 to perform various functions, such as receiving and/or storing biometric data and/or other identification information, receiving and/or storing identity information and/or health information, matching one or more received digital representations of biometrics and/or other identification information to stored data, retrieving identity information and/or health information associated with stored data matching one or more received digital representations of biometrics and/or other identification information, providing retrieved identity information and/or health information, communicating via the network 810 using the communication unit, and so on. Alternatively and/or additionally, the identification system device 807 may involve one or more memory allocations configured to store at least one executable asset and one or more processor allocations configured to access the one or more memory allocations and execute the at least one executable asset to instantiate one or more processes and/or services, such as one or more gallery management services, biometric identification services, and so on.

Similarly, the station 801 may be any kind of device. The station 801 may include one or more processors 811 and/or other processing units and/or controllers, one or more non-transitory storage media 812 (which may take the form of, but is not limited to, a magnetic storage medium; optical storage medium; magneto-optical storage medium; read only memory; random access memory; erasable programmable memory; flash memory; and so on), one or more communication units 813, one or more health sensors (such as a thermometer and/or other thermal sensor, a blood pressure sensor, a blood test sensor, a blood vessel scanner, a palm-vein scanner, a still image and/or video camera, a 2D and/or 3D image sensor, a saliva sensor, a breath sensor, a deoxyribonucleic acid sensor, a heart rhythm monitor, a microphone, sweat sensors, and so on), one or more biometric reader devices 802 (such as a fingerprint scanner, a blood vessel scanner, a palm-vein scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on), and/or one or more other components. The processor 811 may execute one or more sets of instructions stored in the non-transitory storage media 812 to perform various functions, such as using the biometric reader device 802 to obtain one or more digital representations of one or more biometrics (such as a digital representation of a fingerprint, a blood vessel scan, a palm-vein scan, a voiceprint, a facial image, a retina image, an iris image, a deoxyribonucleic acid sequence, a heart rhythm, a gait, and so on) for a person, obtaining health information for a person using the health sensor, communicating with the identification system device 807 via the network 810 using the communication unit 813, and so on.

Likewise, the mobile device 809 may be any kind of device. The mobile device may include one or more processors 817 and/or other processing units and/or controllers, one or more non-transitory storage media 818 (which may take the form of, but is not limited to, a magnetic storage medium; optical storage medium; magneto-optical storage medium; read only memory; random access memory; erasable programmable memory; flash memory; and so on), one or more communication units 819, and/or one or more other components. The processor 817 may execute one or more sets of instructions stored in the non-transitory storage media 818 to perform various functions, such as communicating via the network 810 using the communication unit 819, making and/or receiving cellular telephone calls, sending and/or receiving text messages, and so on.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices and systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

Example information can include, but may not be limited to: personal identification information (e.g., names, social security numbers, telephone numbers, email addresses, physical addresses, driver's license information, passport numbers, and so on); identity documents (e.g., driver's licenses, passports, government identification cards or credentials, and so on); protected health information (e.g., medical records, dental records, and so on); financial, banking, credit, or debt information; third-party service account information (e.g., usernames, passwords, social media handles, and so on); encrypted or unencrypted files; database files; network connection logs; shell history; filesystem files; libraries, frameworks, and binaries; registry entries; settings files; executing processes; hardware vendors, versions, and/or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

In various implementations, a system for biometric gallery management at crowded events may include a station with a non-transitory storage medium that stores instructions and a processor. The processor may execute the instructions to use mobile devices to ascertain most proximate people to the station, generate preliminary identifications of the most proximate people using the mobile devices, populate a local gallery from a main gallery with biometric data for the most proximate people using the preliminary identifications, and attempt to perform a biometric identification using the local gallery.

In some examples, the processor may generate the preliminary identifications by communicating with an identification system device. In a number of such examples, the processor may transmit information received from the mobile devices to the identification system device. In various such examples, the processor may receive the information from apps associated with the identification system device that are executing on the mobile devices. In some such examples, the processor may receive the biometric data from the identification system device.

In a number of examples, the processor may use the mobile devices to ascertain a maximum number of the most proximate people. In various examples, the processor may attempt to use the main gallery to perform the biometric identification upon failure of the attempt to perform the biometric identification using the local gallery.

In some implementations, a system for biometric gallery management at crowded events may include a non-transitory storage medium that stores instructions and a processor. The processor may execute the instructions to use mobile devices to ascertain most proximate people to a station, generate preliminary identifications of the most proximate people using the mobile devices, populate a local gallery from a main gallery with biometric data for the most proximate people using the preliminary identifications, and exclude a person of the most proximate people from the local gallery.

In a number of examples, the processor may exclude the person because the person has been one of the most proximate people for more than a threshold time. In various examples, the processor may exclude the person because the person is in an employee gallery. In some examples, the processor may exclude the person by removing a portion of the biometric data corresponding to the person from the local gallery. In a number of examples, the processor may exclude the person by omitting adding corresponding data for the person to the local gallery.

In various examples, the station may attempt to perform a biometric identification using the local gallery and, upon failure of the attempt to perform the biometric identification using the local gallery, attempt to use an exclusion gallery that includes data for the person to perform the biometric identification. In some such examples, the processor, upon the failure of the attempt to perform the biometric identification using the exclusion gallery, may attempt to use the main gallery to perform the biometric identification.

In a number of implementations, a system for biometric gallery management at crowded events may include a non-transitory storage medium that stores instructions and a processor. The processor may execute the instructions to use mobile devices to ascertain most proximate people to a station; generate preliminary identifications of the most proximate people using the mobile devices; populate a local gallery from a main gallery with biometric data for the most proximate people using the preliminary identifications; and in response to detecting that the most proximate people have changed, modify the local gallery so that the biometric data corresponds to currently detected most proximate people.

In various examples, the processor may perform an action using identity information associated with a person that the processor accesses upon biometrically identifying the person using the local gallery. In some such examples, the action may include controlling access to an area.

In a number of examples, the system may further include a communication unit that the processor uses to communicate with the mobile devices. In some examples, the biometric data may include images of at least a portion of faces. In various examples, the main gallery may include additional biometric data corresponding to additional people.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to biometric gallery management at crowded venues. Mobile devices may be used to ascertain the most proximate people to a station that performs biometric identification. A preliminary identification of those people may be generated that enables biometric data for those most proximate people to be obtained from a main gallery. A local gallery may be populated from the main gallery using the preliminary identification. Biometric identification may be attempted to be performed using the local gallery. This may enable the local gallery to be sufficiently small so as to increase speed and accuracy of biometric identification while ensuring that the most likely biometric data needed for biometric identifications is available in the local gallery since the associated people are those most proximate to the station that will perform the biometric identification.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for biometric gallery management at crowded events, comprising:
    a station including:
        a non-transitory storage medium that stores instructions; and
        a processor that executes the instructions to:
            use mobile devices to ascertain most proximate people to the station;
            generate preliminary identifications of the most proximate people using the mobile devices;
            populate a local gallery from a main gallery with biometric data for the most proximate people using the preliminary identifications;
            exclude a person of the most proximate people from the local gallery because the person is in an employee gallery; and
            attempt to perform a biometric identification using the local gallery.

2. The system of claim 1, wherein the processor generates the preliminary identifications by communicating with an identification system device.

3. The system of claim 2, wherein the processor transmits information received from the mobile devices to the identification system device.

4. The system of claim 3, wherein the processor receives the information from apps associated with the identification system device that are executing on the mobile devices.

5. The system of claim 2, wherein the processor receives the biometric data from the identification system device.

6. The system of claim 1, wherein the processor uses the mobile devices to ascertain a maximum number of the most proximate people.

7. The system of claim 1, wherein the processor attempts to use the main gallery to perform the biometric identification upon failure of the attempt to perform the biometric identification using the local gallery.

8. A system for biometric gallery management at crowded events, comprising:
a non-transitory storage medium that stores instructions; and
a processor that executes the instructions to:
use mobile devices to ascertain most proximate people to a station;
generate preliminary identifications of the most proximate people using the mobile devices;
populate a local gallery from a main gallery with biometric data for the most proximate people using the preliminary identifications; and
exclude a person of the most proximate people from the local gallery because the person is in an employee gallery.

9. The system of claim 8, wherein the processor excludes an additional person because the additional person has been one of the most proximate people for more than a threshold time.

10. The system of claim 8, wherein the station comprises an automated gate.

11. The system of claim 8, wherein the processor excludes the person by removing a portion of the biometric data corresponding to the person from the local gallery.

12. The system of claim 8, wherein the processor excludes the person by omitting adding corresponding data for the person to the local gallery.

13. The system of claim 8, wherein the processor:
attempts to perform a biometric identification using the local gallery; and
upon failure of the attempt to perform the biometric identification using the local gallery, attempts to use an exclusion gallery that includes data for the person to perform the biometric identification.

14. The system of claim 13, wherein the processor, upon the failure of the attempt to perform the biometric identification using the exclusion gallery, attempts to use the main gallery to perform the biometric identification.

15. A system for biometric gallery management at crowded events, comprising:
a non-transitory storage medium that stores instructions; and
a processor that executes the instructions to:
use mobile devices to ascertain most proximate people to a station;
generate preliminary identifications of the most proximate people using the mobile devices;
populate a local gallery from a main gallery with biometric data for the most proximate people using the preliminary identifications;
exclude a person of the most proximate people from the local gallery because the person is in an employee gallery; and
in response to detecting that the most proximate people have changed, modify the local gallery so that the biometric data corresponds to currently detected most proximate people.

16. The system of claim 15, wherein the processor performs an action using identity information associated with a person that the processor accesses upon biometrically identifying the person using the local gallery.

17. The system of claim 16, wherein the action comprises controlling access to an area.

18. The system of claim 15, wherein the system further includes a communication unit that the processor uses to communicate with the mobile devices.

19. The system of claim 15, wherein the biometric data comprises images of at least a portion of faces.

20. The system of claim 15, wherein the main gallery includes additional biometric data corresponding to additional people.

* * * * *